United States Patent [19]

Hoff

[11] 4,277,936
[45] Jul. 14, 1981

[54] COMBINED FLYWHEEL AND CLUTCH DRIVER, AND CONTROL AND WARNING DEVICE

[75] Inventor: Stephen J. Hoff, Richmond, Ind.

[73] Assignee: Hoffco, Inc., Richmond, Ind.

[21] Appl. No.: 65,951

[22] Filed: Aug. 13, 1979

[51] Int. Cl.³ .................. A01D 69/08; A01D 69/00
[52] U.S. Cl. .................................... 56/11.7; 56/11.3
[58] Field of Search ............. 56/11.3, 10.8, 11.7, 56/11.8, 11.1; 192/12 R, 19

[56] References Cited

U.S. PATENT DOCUMENTS

| 3,026,665 | 3/1962 | Hoff | 56/11.3 |
| 3,253,391 | 5/1966 | Meldahl | 56/11.3 |
| 4,035,994 | 7/1977 | Hoff | 56/11.3 |
| 4,044,533 | 8/1977 | Wick | 56/11.3 |
| 4,148,173 | 4/1979 | Hoff | 56/11.3 |
| 4,152,881 | 5/1979 | Hoff | 56/11.3 |
| 4,205,737 | 6/1980 | Harkness et al. | 56/11.3 |

FOREIGN PATENT DOCUMENTS 1180198 10/1964 Fed. Rep. of Germany ........ 192/12 R

Primary Examiner—Paul J. Hirsch
Attorney, Agent, or Firm—Jenkins, Coffey, Hyland, Badger & Conard

[57] ABSTRACT

A combined engine flywheel and centrifugal clutch driver for a rotary lawn mower blade. Two heavy circular plates, as a quarter-inch steel plate, of large diameter, e.g., six inches, are riveted together against three peripherally spaced pairs of spacer slugs stamped from the same material, and against a central shouldered hub. This forms a rotor of sufficient rotational inertia when mounted on the depending shaft of a mower engine to provide the principal flywheel effect for an engine having a relatively lightweight magneto and fan rotor at its top end.

15 Claims, 9 Drawing Figures

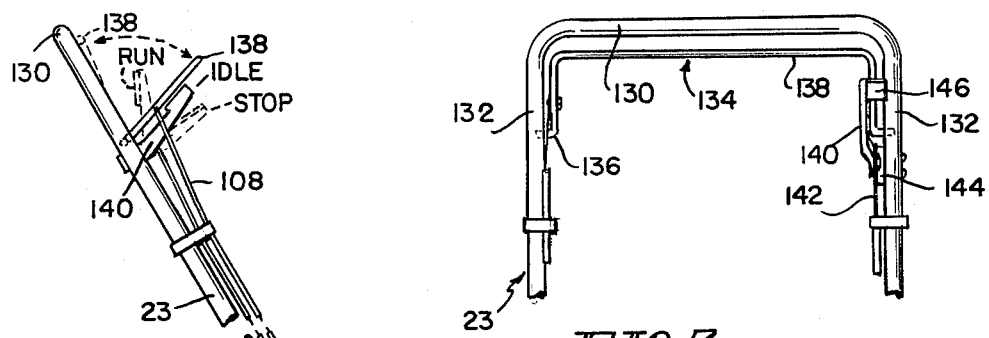
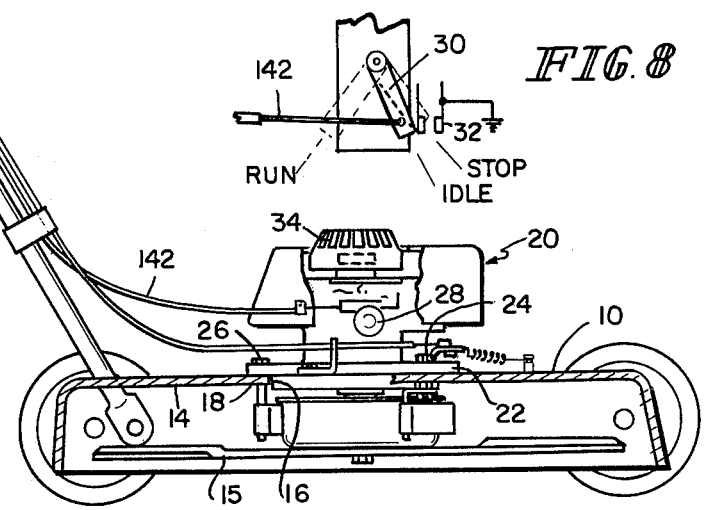
FIG. 7
FIG. 8
FIG. 1
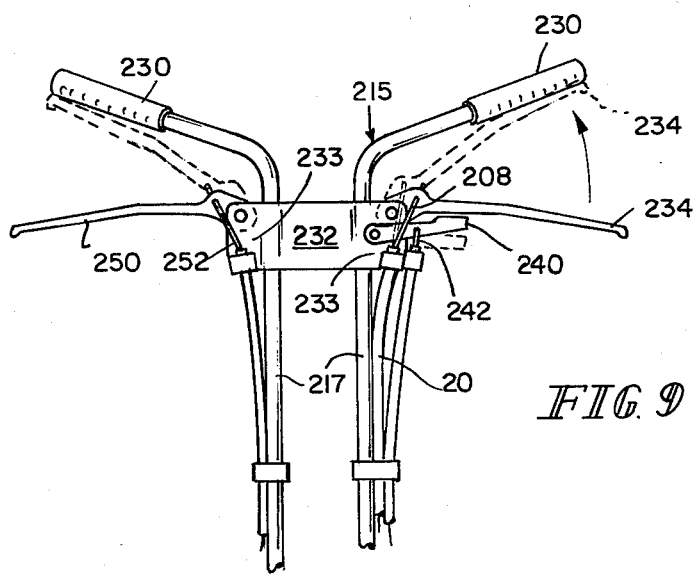
FIG. 9

COMBINED FLYWHEEL AND CLUTCH DRIVER, AND CONTROL AND WARNING DEVICE

For a number of years there has been a growing appreciation of the danger and other disadvantages of the common practice of fixing a rotary mower blade directly to the depending drive shaft of an engine. My prior U.S. Pat. No. 3,026,665 of Mar. 27, 1962 points out that such direct drive causes engine shafts to be bent when the blade strikes an obstruction, that overloading the direct-driven blade stalls the engine, with resulting inconvenience, and that the direct drive endangers the operator and others because the blade always rotates with the engine, even during starting and idling. The seriousness of this latter danger has lead the government to propose safety requirements for a "deadman" lever on the mower handle which will stop the blade except when the operator is in operating position and holding the lever. A deadman control requires high reliability, should cause minimum increase in the cost of the mower, and should have an effective and inexpensive control arrangement. My said prior patent, and my U.S. Pat. No. 4,035,994 of July 19, 1977, sought to meet the safety requirements by declutching the blade from the engine drive shaft and braking the blade to a stop when the deadman lever was released. With the type of lawn mower engine which is made in large quantities and used almost universally in small lawn mowers, such declutching creates a problem in that the engine has only a relatively lightweight magneto and fan rotor at the top and relies on the blade itself for its major flywheel effect so that flywheel effect is lost when the blade is declutched. Using a heavier top rotor maintains flywheel effect, but causes stress and breakage of engine shafts. This problem was overcome by mounting a flywheel on the clutch hub which is attached at the lower end of the engine shaft, and this concept is claimed in related U.S. Pat. No. 4,148,173. Further, with the engine and clutch brake controls contemplated in those prior patents, if the engine lost power while in the deadman lever was held in actuated position, the blade could overrun the clutch driver and could windmill silently and present a hazard. To overcome this, my U.S. Pat. No. 4,152,881 discloses an audible warning device in which a clicker arm is mounted on the clutch driver and sounds a warning in the event the motor stops and the blade overruns and spins from its own momentum, while a centrifugal weight retracts the clicker arm when the clutch operates normally.

The present invention carries forward the concepts of those prior patents and provides improved blade drive and control mechanism. In accordance with the invention, a centrifugal clutch driver for the blade is made with such large mass and diameter as to have sufficient rotational inertia to provide the principal flywheel effect for an engine having a lightweight rotor at its top end, preferably by making such rotor from two heavy circular plates, as of quarter-inch steel plate, and of large diameter, e.g., six inches, and riveting the plates together against a central shouldered hub and against three spaced peripheral pairs of spacer slugs stamped from the same heavy steel plate. The heavy, large diameter rotor is provided with a plurality of centrifugal clutch shoes at its periphery, preferably with wide friction faces equal to the rotor width, which are mounted on the rotor by means of narrow end tangs extending between the plates, as to pivots at one end and retracting springs at the other. The flywheel and clutch rotor is surrounded by a drum of corresponding large diameter, which carries the mower blade and provides a large diameter external surface for engagement by a brake band. The drum is desirably not larger than the opening defined by the engine mounting rim on the deck of the lawn mower, so that the clutch-flywheel rotor and clutch-brake drum are adapted to be assembled on the engine shaft before the engine is mounted on the deck, and to pass through that opening as the engine is so mounted. Also, the large drum permits the brake band to be mounted on bolts located in the standard engine mounting pattern which also serve to mount the engine. The massive, large diameter clutch rotor not only provides the necessary flywheel effect, but also places the clutch shoes at a large radius so that the clutch requires little shoe area, yet gives good speed response. Correspondingly, the large brake drum provides highly effective braking. Both the clutch and brake are of high capacity and durability so as to have long life and high operating reliability even when operated in an adverse exposed condition below the deck of a lawn mower. Further, the brake band is adapted to be operated by a simple lever which extends up through the deck of the mower, the rotor and drum form a substantially closed assembly, and the arrangement eliminates the protective and brake-mounting bowl and a number of other parts which were required in the mechanism of U.S. Pat. No. 4,035,994. It similarly eliminates the necessity for a separate flywheel as contemplated in U.S. Pat. No. 4,148,173. Also, a simplified blade rotation warning device is desirably mounted directly on the flywheel-clutch rotor and spring-pressed against centrifugal force to a position in which it lies in the path of a striker element, such as the blade-mounting nuts, within the drum so as to produce an audible warning signal as contemplated in U.S. Pat. No. 4,152,881.

Further in accordance with the present invention, the brake is biased to ON position and connected to a manual deadman lever so that the brake is released when the deadman lever is held in actuated position; while the engine has a separate manual throttle control with "stop", "idle", and "run" positions which is mounted in the path of brake-applying movement of the deadman lever so as to be moved by that lever to its idle position when the deadman control lever is released from its actuated position. This control arrangement provides desirable capability for the deadman lever to be moved to actuated position independently of the throttle control and while the throttle control remains in idle position, which is especially desirable in self-propelled mowers. It permits throttle adjustment over a range of run positions, and it insures that the throttle will be moved from any run position to idle position when the deadman lever is released. However, this also permits the throttle control to be moved from a fast run position to idle or stop while the deadman lever is held actuated, which has the effect of releasing the centrifugal clutch from drive connection with the blade while the brake is held disengaged by the deadman lever so that the blade can run free under its own momentum while the sound of the engine fails to give any warning of such dangerous rotation. Under such conditions, the clicker gives an audible signal of the overrunning operation of the blade.

The accompanying drawings illustrate the invention and show a preferred embodiment exemplifying the best mode of carrying out the invention as presently perceived.

In such drawings:

FIG. 1 is a side elevation of a manually-propelled lawn mower embodying the invention;

FIG. 7 is an elevational view of the upper portion of the lawn mower handle shown in FIG. 1, showing the deadman lever and a throttle control;

FIG. 8 is a diagrammatic plan view of the engine throttle arm and associated grounding switch; and FIG. 9 is a view of an alternative handle and control mechanism which includes a propulsion control for a self-propelled mower.

Figure 2:
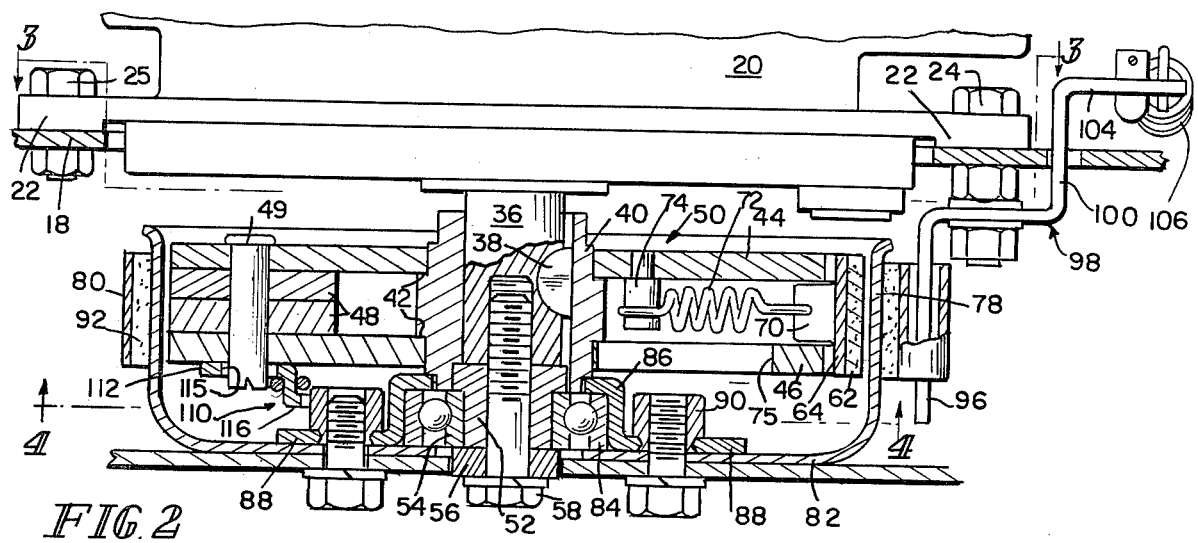
FIG. 2 is a section taken on the line 2—2 of FIG. 1 showing the blade drive mechanism.

The lawn mower shown in the drawings comprises a housing 10 mounted on suitable wheels and having a top deck 14, and a handle 23. The deck has a central opening 16 defined by a surrounding rim 18 on which the engine 20 is mounted by means of a mounting flange 22, for driving the blade 15. Conventionally, the engine is held in place by three bolts 24, 25, 26 in a generally accepted standard bolt pattern. The engine 20 has a carburetor 28 controlled by a throttle arm 30 movable between idle and a range of run positions, and movable beyond idle to engage a grounding switch 32 for grounding the ignition of the engine and thus stopping it.

The engine has a vertical shaft, the upper end of which carries a magneto and fan rotor 34 of relatively light weight and low mass, insufficient to provide the desired flywheel effect for the engine. The lower end 36 of the shaft projects downward from the engine housing into the space below the mounting deck 14, and has a blade supporting and driving mechanism mounted thereon. This comprises a hub 40 keyed to the shaft end 36 by a key 38 and formed with opposite facing shoulders 42. A generally circular top plate 44 and similar bottom plate 46 are mounted on the hub against such shoulders 42, and at their outer peripheries are held in spaced relation by three pairs of spacer slugs 48. The two plates 44 and 46 are riveted together against such spacer slugs by rivets 49 so that they form with a hub 40 a generally-circular unitary rotor 50 which is keyed to the shaft 36 and rotates therewith. The bottom end of the hub 40 carries an extension 52 having a smaller diameter portion which receives the inner race 54 of a ball bearing set, and such race is secured to the hub by a washer 56 and a bolt 58 which is threaded into the lower end 36 of the engine shaft.

The rotor 50 serves both to provide the primary flywheel effect for the engine 20 and also as a centrifugal clutch drive member. To provide such flywheel effect, the rotor 50 is formed of heavy plates 44, 46, conveniently stamped from heavy hot-rolled steel plate, for example, quarter-inch steel plate, and of relatively large diameter, for example, six-inch diameter. The spacer slugs 48 form weights which add to the peripheral mass of the rotor 50 to increase its rotational inertia and it flywheel effect. The diameter of the rotor and the surrounding clutch drum referred to below is related to the size of the opening 16 in the mover deck 14 and is sufficiently smaller than that opening to permit the rotor and drum to be assembled to the shaft end 36 before the engine is mounted on the mower deck, and to pass through the opening 16 as the engine is thus mounted. This permits the plates and rotor to be of sufficiently large diameter to serve as a flywheel.

Figure 5:
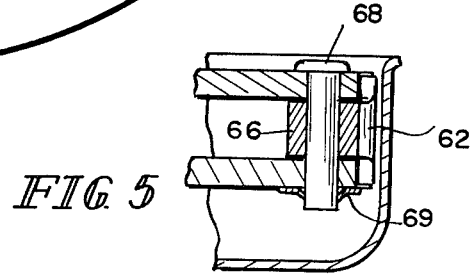
FIG. 5 is a section taken on the line 5—5 of FIG. 3.
Figure 6:
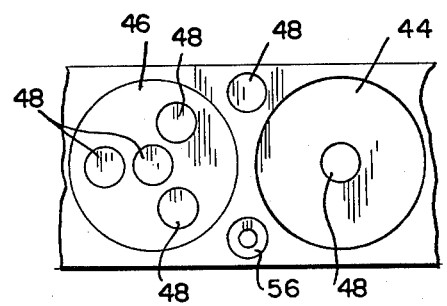
FIG. 6 is a diagrammatic view of a die cutting pattern which provides the top and bottom plates of the clutch rotor and also provides the spacer slugs against which they are riveted.

For purposes of the function of the rotor 50 as a centrifugal clutch driver, the generally circular top and bottom plates are formed at three spaced points about their peripheries with shallow recesses 60 between the positions of the spacer slugs 48, in which clutch shoes 62 are mounted. As shown in FIGS. 2 and 5, the clutch shoes have clutch face portions 64 of substantially the same full width as the rotor 50, and are mounted by means of narrower tangs which enter between the plates 44 and 46. The tang 66 at the leading end of each shoe 62 is bent to form a pivot loop mounted on a pivot pin 68 passing through the two plates and held in place with a retainer clip 69. The tang 70 at the trailing end of each clutch shoe 62 is engaged by a biasing spring 72 which extends inward to an anchor post 74 driven into an opening in the top plate 44. For purposes of providing access to the springs 72 and to permit them to be engaged on the posts 74, the bottom plate 46 is desirably provided with three circular access openings 75. Such openings and the central hub-receiving openings of the two plates are desirably all of the same size, and all are formed by stamping out of the steel plate material circular pieces which form the spacer weights or slugs 48. As will be seen in the stamping pattern of FIG. 6, which may be used to form the plates and the slugs, the bottom plate 46 has four such openings and the top plate has a single central opening so that such openings provide five of the six required spacer slugs 48. The sixth may be punched from scrap material in the margin between the two plates 44 and 46, while the hub-retaining washer 56 is stamped from the opposite marginal portion of the stock material.

The combined flywheel and clutch drive rotor 50 is surrounded by a cylindrical drum 78 adapted to be engaged on its inner surface by the centrifugal clutch shoes 62 and on its outer surface by a brake band 80. The cylindrical drum 78 is connected at the bottom to a radial flange 82 extending inward into underlapping relation with the outer race 84 of the ball bearing set previously referred to. Such outer race 84 is retained between the inner edge of the drum flange 82 and the inturned flange at the top of a mounting ring 86 which has a wide base flange 88 lying against the drum flange 82. Such flange carries at diametrically opposite points a pair of rivet nuts 90 which have upstanding nut portions and neck portions which extend through the flanges 88 and are clinched or riveted thereto. The flanges 82 and 88 are desirably riveted together at at least two points angularly spaced from the nuts 90. The rotor is nested in the drum 78 and its top plate substantially closes the open upper end of that drum, so as to form a substantially closed assembly suitable for operation in exposed position above the blade.

The brake band 80 carries a lining 92 over most of its length, and is formed at its ends with mounting loops 94. The loop at one end is anchored to the motor mounting bolt 26, which is made long enough to extend through the plane of the brake band for this purpose. The opposite end loop 94 is engaged on the downturned finger 96 of a brake lever 98 which is pivotally mounted between a pair of nuts on the bottom end of the motor mounting bolt 24. Outward from such pivotal mounting, the brake arm 98 has an upward extending portion 100 which extends through an arcuate opening 102 in the mower deck 14, and above that deck has an outward extending portion 104 which is connected to a brake-actuating spring 106 which normally biases the lever 98 in a direction to apply the brake to the drum 78. An actuating cable 108 is connected to the end portion 104 of the brake lever to move it to release position, as will be described below.

Figure 4:
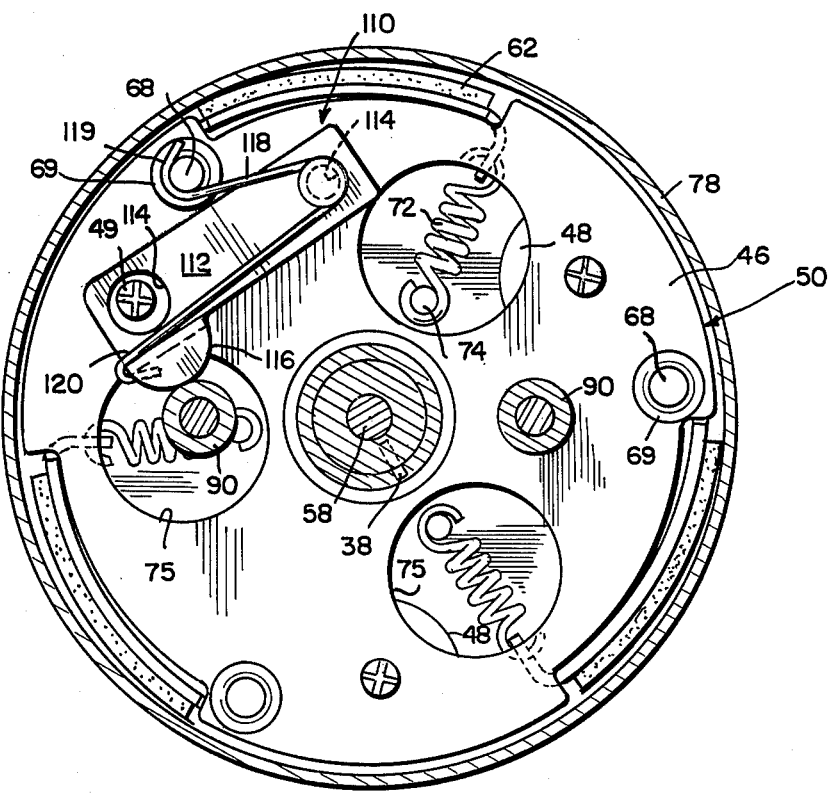
FIG. 4 is a section taken on the line 4—4 of FIG. 2 showing the flywheel and clutch rotor in bottom elevation (and oriented differently than in FIG. 2) and showing the audible signal device mounted on that rotor.

As shown in FIGS. 2 and 4, the bottom face of the rotor 50 carries a clicker lever 110 adapted to make an audible signal when the blade overruns the clutch driver. Such lever has a flat plate portion 112 which lies slidably against the bottom surface of the bottom plate 46 and is pivoted to that plate by a shouldered rivet 114. From that pivot, the plate 112 extends to and beyond the position of one of the rivets 49 by which the spacer slugs are riveted between the rotor plates, and the clicker lever is there provided with a large opening 115 which surrounds the lower end of the rivet 49 so that such rivet serves as a stop for movement of the lever between a normal position shown in full lines in FIG. 4 and a retracted position shown in dotted lines in FIG. 4. At its free end, the clicker lever 112 carries a downward offset 116 formed with a rounded inner nose which normally lies in an interfering relationship with the drum nuts 90. The clicker lever 110 is biased by a biasing spring 118 to its normal position, in which its offset portion 116 is adapted to strike the drum nuts 90. The spring has a central bite engaged about the shouldered rivet 114, has a fixed end 119 looped about the end of an adjacent shoe pivot pin 68, and has a movable end 120 engaged against the side face of the offset 116 at the end of the clicker arm and hooked beneath its formed end. The strength of the biasing spring 118 is such that if the rotor 50 is rotating at a predetermined rate, which may be higher than the idling speed of the engine, the clicker arm 110 will be swung by centrifugal force outward from its normal position shown in full lines in FIG. 4 to its retracted position, where its offset end 116 will be carried out of interfering relation with the drum nuts 90. If the rotor 50 is stopped or rotating at idling speed, the clicker arm 110 will remain in its normal position and if the blade and drum assembly overruns the rotor 50, the drum nuts 90 will strike the offset end 160 of the clicker arm and will produce a loud clicking noise which will serve as a warning signal that the blade is rotating and dangerous.

In my prior patents, the blade brake and the engine throttle were both connected to a single deadman control lever so that actuation of that lever from release position to actuated position would both release the brake and move the throttle from idle to a predetermined high speed run position, while release of that lever would apply the brake and move the throttle to idle position. In accordance with the present invention, the brake and throttle are connected to separate manual controls which have an interacting relationship that permits the deadman lever to be moved to actuated position, to release the brake, without actuating the throttle, and which thus allows the throttle to be manually adjusted to a run position over a considerable range and hence allows the engine to be operated at different speeds. On the other hand, the interrelationship is such that when the deadman lever is released, it actuates the throttle from any run position to its idle position so as to reduce the engine and clutch driver speeds and allow the centrifugal clutch to disengage as the brake is applied.

As shown in FIGS. 1, 7, and 8, the mower handle 23 is formed at its upper end in a generally U-shaped configuration with a transverse hand grip bar 130 and side portions 132. A deadman lever 134, also in generally U-shaped configuration, has out-turned ends 136 received in punched openings in the side legs 132 of the handle and has a cross bar 138 which in actuated position shown in dotted lines in FIG. 1 lies close to the cross bar 130 of the handle and in released position swings forward to a release position shown in full lines in FIG. 1. One side leg of the deadman lever is connected to the brake cable 108, so that as the deadman lever is moved from its released position to its actuated position against the handle cross bar 130, the brake lever 98 is swung against the bias of the tension spring 106 and in a direction to release the brake band from the blade drum.

The throttle lever 30 of the engine is connected to a separate throttle control lever 140 by a Bowden wire 142 capable of both pull and push transmission of movement. The throttle control lever 140 is pivoted on a side leg 132 of the mower handle as by means of a bracket 144 mounted thereon and on a pivot axis close to the pivot axis of the deadman lever 134. Also, the throttle lever 140 has a handle 146 or other portion which lies in the path of the adjacent side leg of the deadman lever 134 so that the deadman lever will drive the throttle lever to its idle position as the deadman lever moves from actuated to released position. The throttle control lever is also manually movable beyond the idle position to a stop position, in which it drives the throttle lever 30 on the carburetor against the grounding switch 32 so as to ground out the ignition of the engine and stop the engine.

Operation of the mechanism so far described is as follows: It is assumed that the engine is stopped, the deadman lever 134 is in released position, and the throttle control lever in stop position. The brake band 80 will then be engaged with the blade drum 78, the clutch shoes 62 will be retracted, and the clutch disengaged from the drum 78. If the engine is one which will start at idle setting, the throttle lever may be moved from stop to idle, and the engine then started. At idle speeds, the clutch shoes will remain retracted and the clutch will remain disengaged. If the engine requires a run position for starting, the deadman lever 134 is moved to its actuated position and manually held against the handle cross bar 130, the throttle lever is then moved to a starting run position, and the engine started under these conditions. The deadman lever can then be released, and its movement to released position will drive the throttle lever to its idle position, which will reduce the engine speed, disengage the clutch, and apply the brake.

For mowing operation, the deadman lever 134 is moved to its actuated position and manually held against the handle cross bar 130. The throttle control lever is then moved to a desired run position at any selected point in the range of run positions between idle and full-speed positions. Movement of the deadman lever releases the brake, and acceleration of the engine causes the centrifugal clutch shoes 62 to engage the blade drum 78 so as to drive the blade 15. During this operation, the throttle lever may be manually adjusted to vary the cutting speed of the blade to suit the load conditions. If the mower encounters heavy grass and/or weeds and is overloaded, the excess load will reduce the speed of the blade, and this in turn will reduce the speed of the engine and the clutch driver 50 so that the clutch will partially slip and allow the engine to continue operation at high torque. Such operation in many cases will overcome the excess load and the engine will regain speed and the clutch will become fully engaged and drive the blade at full speed. If the load is such as to stop the blade, the clutch will be sufficiently slowed and released to permit the engine to continue to operate and the load will not "kill" the engine. The operator can then take suitable action to relieve the load, such as to back off from the heavy grass or to tilt the mower to lift the blade out of the grass, so as to allow the blade to resume rotation. This will allow the clutch driver and engine to resume speed and re-establish full driving force to the blade.

To discontinue mower operation, the deadman lever is released from its manually-held actuated position, and the tension of the brake-actuating spring 106 will then pull the brake lever 98 to its brake-engaging position. As the deadman lever 134 moves to its released position as shown in full lines in FIG. 1, its side leg will strike the throttle control lever 140 and move that lever to its idle position. This will reduce the speed of the engine and consequently that of the clutch driver, and the clutch will disengage. The engine will then continue to operate at idle speed, and such operation will be smooth and regular, despite the disconnection of the mass of the blade from its connection with the engine shaft, by reason of the flywheel effect of the flywheel and clutch rotor 50 which continues to rotate. To stop the engine, the throttle control lever is manually pushed from idle to stop position, and this moves the throttle lever against the grounding switch 32 to ground out the ignition.

In all of these operations described above, the flywheel and clutch rotor 50 will be either operating at the same speed as the blade and blade drum 78 or will be overrunning such drum and blade and rotating at a speed which will cause centrifugal force to move the clicker lever 112 to its retracted position out of the path of relative movement of the drum nuts 90 so that there will be no engagement between those nuts and the clicker offset nose 116 and no audible signal will be generated. On the other hand, if the deadman lever 134 is held in its actuated position while the throttle control lever is moved to its stop position, the deadman lever will hold the brake 90 in disengaged position while the engine will be stopped so as to cause the centrifugal clutch shoes to retract and that clutch to be disengaged. This will leave the blade and blade drum 78 free to rotate under their own momentum, and such momentum may be sufficient to cause the blade to continue to rotate for several seconds at speeds sufficient to be dangerous in the event an operator or bystander movers his hand or foot into the path of the rotating blade. Under these conditions, however, centrifugal force on the clicker arm 110 will be insufficient to overcome the biasing spring 118, and that arm will move to its normal position shown in full lines in FIG. 4, where its offset nose 16 will lie in the path of relative movement of the drum nuts 90. Accordingly, such drum nuts will strike the clicker arm 110 and produce a loud clicking or clacking sound which will serve as a warning that parts of the mower are still rotating and that hands and feet should be kept out of the path of the blade.

As has been indicated, the heavy rotor 50 mounted directly on the lower end of the crankshaft 36 can provide the primary flywheel effect for the engine and permit the engine to be used with a relatively lightweight magneto and fan rotor 34 at the top of the engine. By way of example, with an engine having a top rotor weighing about one pound, eleven ounces, I use a rotor 50 weighing about four and one-half pounds and designed as shown with extra mass provided by the spacer lugs 48 adjacent the periphery of the rotor. Substantially the same engine is available on the market in limited quantities and at substantial extra cost with a heavy flywheel at the top weighing about five pounds, eleven ounces, but the flywheel arrangement of the present invention has substantial advantages over the use of that heavy flywheel engine. When a heavy flywheel is used at the top of the engine and connected to a mower blade during use, and if the blade strikes a fixed object, the crankshaft is severely stressed in torque and may break. In contrast, with the mass of the flywheel closely adjacent the blade, such crankshaft torque stresses are avoided. Also, when the end of a blade strikes a fixed object, the blade tends to rotate about the point of impact, and this causes a lateral bending thrust on the crankshaft. The presence of the mass of the rotor 50 closely adajcent the blade at its center tends to absorb the lateral thrust under such circumstances and thus further tends to reduce damage from such impact. The present invention places the mass of the rotor 50 even closer to the blade than the mass of the flywheel in U.S. Pat. No. 4,035,994.

The large diameter of the rotor 50 not only contributes to its effectiveness as a flywheel, but also provides advantages in its function as a clutch driver. The clutch shoes lie at a long radius from the axis so that they transmit torque with a long lever arm. They are also highly responsive to rotational speed and provide high capacity for the clutch, and can be made less self-energizing so as to give a smoother clutch operation. The shoes are subjected to less loading than in a smaller diameter clutch and hence can be made of less expensive material. Thus, for example, the shoes in the smaller diameter clutch shown in U.S. Pat. No. 4,035,994 are desirably made as formed powdered metal parts, whereas the shoes of the present clutch may be made as stampings with relatively soft frictional lining material bonded to them. The resulting clutch is adapted to withstand prolonged operation under slipping conditions, without overheating.

The combined flywheel and clutch mechanism is of relatively simple and inexpensive construction, and is especially advantageous for its application to a lawn mower blade drive as here shown. Beside being functionally advantageous, the rotor and drum form a substantially closed assembly which is suitable for exposed operation in the same chamber with the blade. In addition, the same mechanism is adapted for various other uses. On the one hand, it can adapt the relatively inexpensive type of engine shown and described to a variety of other uses, by providing an effective flywheel at the output end of the shaft while also providing a centrifugal clutch function. On the other hand, it provides an advantageous clutch structure of high capacity and high reliability which can have a variety of applications where the clutch function is of primary importance and the flywheel function of less importance. Examples of such applications include snow blower drives, drives for post hole augers and garden equipment such as tillers, for pumps, etc.

Figure 3:
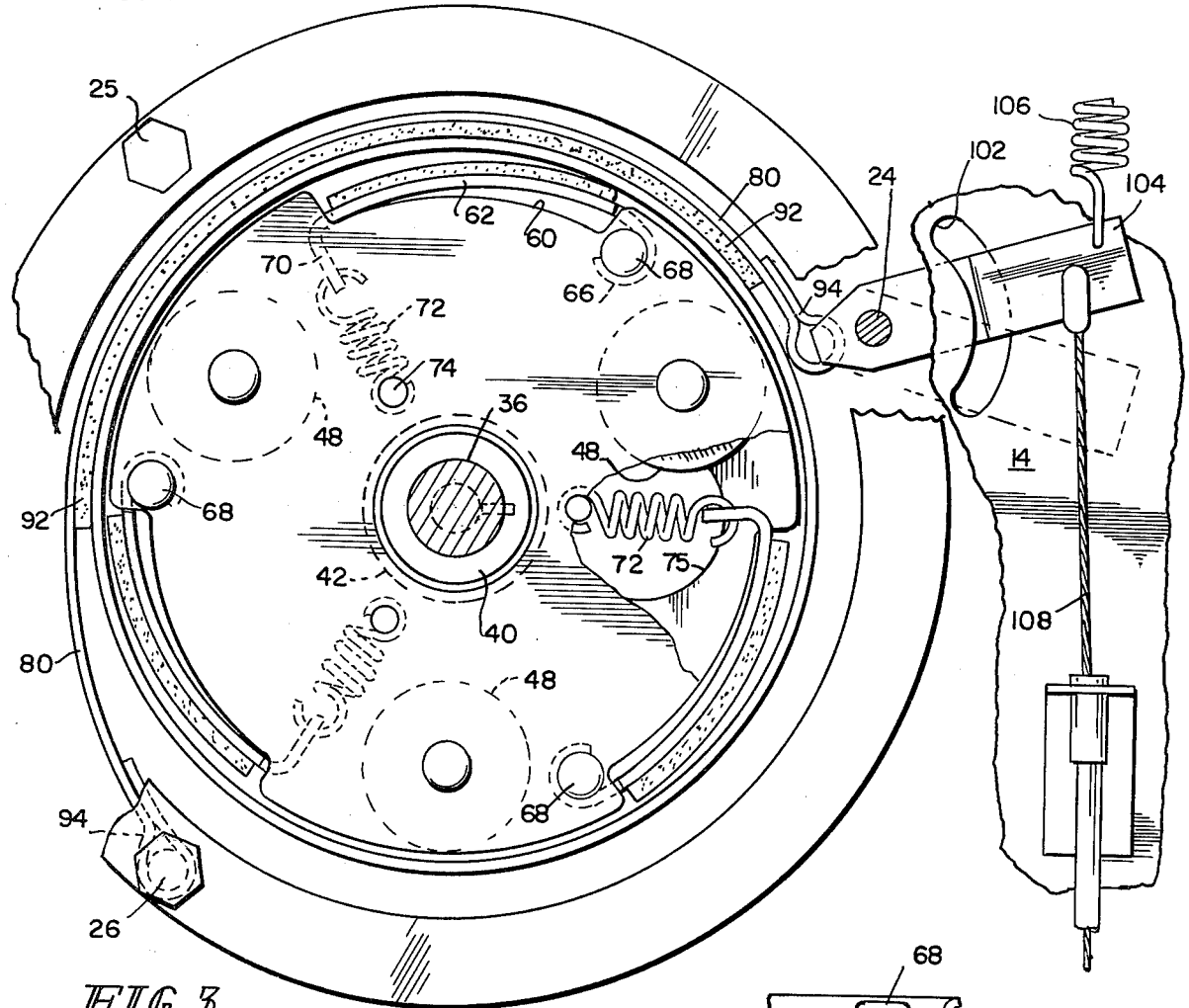
FIG. 3 is a plan view of the blade drive mechanism, taken on the line 3—3 of FIG. 2.

The modified handle and control mechanism shown (somewhat diagrammatically) in FIG. 9 provides not only for a deadman control of the brake for a lawn mower blade and for the throttle of the driving engine, but also a separate control for engaging and disengaging the propulsion drive of a self-propelled mower having a flywheel and clutch combination as shown in the earlier figures. The mower handle 215 shown in FIG. 9 comprises a pair of tubular bars 217 having out-turned ends forming handle grips 230. The bars are clamped together adjacent their upper ends by a clamp 232 which has outer flange portions 233 which provide for pivotal mountings. At one side, preferably the left side as viewed from the operator (to the right in FIG. 9) a deadman lever 234 is pivoted for movement between a released position shown in full lines and an actuated position adjacent the adjacent handle bar 230 as shown in dotted lines. Such deadman lever is connected to a control cable 208 connected to the brake lever 98 in the same manner as the cable 108 shown in FIGS. 1-3. Immediately below the deadman lever 234, a throttle control lever 240 is pivoted to the same flange 233 and connected to a push-pull Bowden wire 242 connected to the engine throttle lever in the same manner as the wire 142 in FIG. 1. The throttle lever 140 has an idle position shown in full lines in FIG. 9 and is movable therefrom downward to a stop position shown in dotted lines, and upward through a range of run positions. The relationship between the deadman lever 234 and the throttle lever 240 is functionally similar to that in FIGS. 1, 7, and 8, in that the throttle lever 240 has a handle or other portion which lies in the path of the deadman lever 234 so that the throttle cannot be moved to run position when the deadman lever is in released position and so that the throttle lever will be driven from a run position to its idle position when the deadman lever moves from actuated to release position.

At the opposite side of the structure, a propulsion control lever 250 is pivotally mounted to the flange 233 and is movable between a released, non-drive position shown in full lines to an actuated, drive position shown in dotted lines. The propulsion lever 250 is connected by a Bowden wire 252 or the like to the propulsion clutch mechanism of the self-propelled mower, which mechanism may take any of several known forms and need not be here described. For present purposes, it is sufficient to note that when the propulsion lever 245 is in its non-drive position as shown in dotted lines, the propulsion drive mechanism is disconnected and no self-propulsion drive takes place, whereas when the lever 250 is manually pulled up against the handle bar 230, the self-propulsion mechanism is engaged so that power is transmitted from the engine to the drive wheels of the lawn mower to propel it forward.

The combined flywheel, clutch, and brake mechanism, and the controls therefor are of special advantage in connection with a self-propelled mower. On the one hand, the propulsion control lever 250 may be left in its non-drive position, and the deadman and throttle control levers operated in the manner described above so that the mower is operated as a manually-propelled mower in the same manner as explained in connection with the mower of FIGS. 1-8. On the other hand, the deadman lever can be left in released position, with the throttle control in idle position so that the engine is operating at idle speed, and the propulsion control handle 250 may be manually moved to its actuated position against the handle bar 230 so as to engage the propulsion drive and cause the mower to be propelled by the idling engine. Under these conditions, the mower blade will be positively held stopped by the brake band 80 while the engine and clutch rotor 50 will be rotating at idling speed at which the clutch shoes 62 will be retracted and the clutch disengaged. The mower can thus be propelled across a gravel driveway or other surface on which it is desirable or necessary that the blade remain stationary for safety reasons.

The control mechanism of FIGS. 1-3 and 7-8, and that of FIG. 9, are shown in relation to handle designs which are somewhat diagrammatically representative of handles in use by different mower manufacturers, and it will be understood that various other handle designs are in use and that the control mechanism may be modified by those skilled in the art to suit such other designs.

I claim:

1. Lawn mower mechanism, comprising
   a combined clutch and flywheel rotor including a hub adapted for rotation about an axis,
   a pair of heavy, generally circular, metal plates mounted on said hub in spaced parallel relation in planes normal to said axis,
   a plurality of spacer weights mounted between said plates at angularly spaced points about and adjacent the periphery thereof to add mass at the periphery of the rotor, the plates being secured together at said weights so as to fix the weights in place and to secure the plates against the weights as spacers,
   a plurality of centrifugal clutch shoes mounted at angularly spaced positions about the periphery of said rotor, between said spacer weights, and means disposed axially between the plates for connecting the shoes in operative relation with the rotor, and
   a vertical axis lawn mower engine having a depending output shaft, the rotor being mounted on the depending shaft, a clutch drum mounted coaxially with said shaft and surrounding the rotor so as to be engaged by said shoes, and a blade carried with said drum, said rotor having large mass sufficient to supply a major portion of the flywheel mass for the engine.

2. Drive mechanism as in claim 1 further comprising shallow recesses in the peripheries of said plates, said clutch shoes having face portions lying in said recesses in overlapping relation with the peripheral edges of the plates, and having mounting portions extending inward therefrom between the plates and there connected in driving relation with the rotor.

3. Drive mechanism as in claim 2 in which the mounting portions of the clutch shoes include pivot means adjacent one end of each shoe and retraction means adjacent the opposite end thereof, each pivot means being engaged to a pivot pin extending between the plates, and each retraction means being connected to a retraction spring anchored to the rotor.

4. Drive mechanism as in claim 3 in which said plates are formed with central openings received over the hub and at least one of the plates is formed with access holes inward of said spacer weights, said holes being formed by punching slugs of metal from the plates of a size for use as said spacer weights.

5. Drive mechanism as in claim 1 in which said plates are of thick metal plate and said spacer weights are stacks of a plurality of slugs cut from the same metal plate, said plates being riveted together and against the spacer weights that said rotor is a rigid rotor having large angular inertia.

6. Drive mechanism as in claim 5 in which said plates are formed with central punched openings received over the hub and at least one of the plates has additional openings punched therein inward of the spacer weights and the spacer weights are stacks of a plurality of slugs of the size punched out to form said openings.

7. Lawn mower mechanism, comprising
 a combined clutch and flywheel rotor including a rotary mass of generally circular configuration,
 a plurality of centrifugal clutch shoes mounted on said rotor at angularly spaced positions thereabout,
 a drum haing a bottom web portion by which it is mounted for rotation in spaced parallel relation with said rotor, and a cylindrical portion positioned for engagement by said shoes,
 means for mounting a mower blade on said drum to be driven by said clutch rotor,
 a centrifugally-responsive clicker element mounted on the bottom side of said rotor and movable between a normal position to which it is biased and a retracted position to which it is moved by centrifugal force,
 and a striker element on the drum in position to be engaged by the clicker element in its normal position but cleared thereby in its retracted position, so as to produce an audible signal when the blade and drum overruns the rotor while such rotor is stopped or rotating at a speed less than sufficient to move the clicker lever to its position.

8. Lawn mower mechanism as in claim 7 in which the clicker lever is pivoted to the rotor and has an inward projecting nose offset toward the web of the drum, and the web carries one or more blade-mounting nuts which rotate in a path to strike said nose when the clicker lever is in its normal position.

9. Lawn mower mechanism as in claim 7 in which the web of the drum carries one or more blade-mounting nuts which rotate in a path to strike said clicker element when it is in its normal position.

10. Lawn mower mechanism including in combination blade drive mechanism comprising
 a drive shaft and power means for driving such shaft,
 a combined clutch and flywheel rotor including a hub mounted on said drive shaft,
 a pair of heavy, generally circular, metal plates mounted on said hub in spaced parallel relation in planes normal to said axis,
 a plurality of spacer weights mounted between said plates at angularly spaced points about and adjacent the periphery thereof to add mass at the periphery of the rotor, the plates being secured together at said weights so as to fix the weights in place and to secure the plates against the weights as spacers,
 a plurality of centrifugal clutch shoes mounted at angularly spaced positions about the periphery of said rotor, between said spacer weights, and means disposed axially between the plates for connecting the shoes in operative relation with the rotor,
 a drum mounted for rotation coaxially with said rotor, and
 a mower blade drivingly connected to said drum,
 said drum having a cylindrical portion positioned for internal engagement by said shoes so as to be driven by said rotor as a clutch driver, and a brake band mounted for external engagement with the drum to stop the drum and its connected blade.

11. Lawn mower mechanism as in claim 10, in which said drive shaft is the shaft of a vertical shaft lawn mower engine havng a base mounting flange, a lawn mower housing on which said engine is mounted by a plurality of angularly spaced bolts, said brake band being anchored on one of said bolts and connected at the other end to a control lever pivotally mounted on another of said bolts.

12. Lawn mower mechanism as in claim 10 in which said power means is an engine controlled by a throttle lever having run, idle, and stop positions,
 means biasing said brake band to engaged position,
 a lawn mower handle and control means including a deadman lever on said handle connected to said brake and movable between actuated position in which it disengages the brake and a release position in which it allows the brake to be engaged by its biasing means,
 a throttle control mounted adjacent said deadman lever and connected to said throttle lever, said throttle control having a part which lies in the path of the deadman lever as it moves from actuated position to release position when the throttle control is in run position, and the throttle control having an idle position to which it is moved by the deadman lever as it moves to released position, whereby the throttle control is movable from idle to run only when the deadman lever is actuated and is driven to idle position by the deadman lever when such lever is released.

13. Lawn mower mechanism as in claim 10 in which said drum includes bottom mounting means and has a cylindrical drum portion which extends upward therefrom, said rotor being positioned within the open upper end of such drum portion and having a top surface which substantially closes such upper end, whereby the assembly of rotor and drum is adapted to be operated in exposed position within a housing that contains said operating mower blade.

14. A lawn mower having an engine controlled by a throttle lever movable from an idle position to a run position and said engine having an output shaft,
 clutch driver means on said shaft, driven means coaxial with said driver means and carrying a lawn mower blade, a brake for braking said blade carrying means to a stop, and means biasing the brake to engaged position,
 control means including a deadman lever connected to said brake and movable between an actuated position in which it disengages the brake and a released position in which it allows the brake to engage to stop the blade,
 a throttle control connected to said throttle lever and having corresponding idle and run positions, said control having a part which in the run position lies in the path of the deadman lever and which in the idle position lies beyond the range of such movement of the deadman lever, so that the deadman lever in its released position blocks movement of the throttle control from idle to run positions, movement of the deadman lever from actuated to released position being operative to drive the throttle control from run position to idle position.

15. A lawn mower as in claim 14 in which said clutch driver is a centrifugal clutch which is disengaged when the engine is at idle speed, whereby release of the deadman lever not only causes engagement of the brake but also drives the throttle control to idle position so as to reduce engine speed to cause disengagement of the centrifugal clutch.

* * * * *